(No Model.)
R. H. WHITE.
CLAMPING DEVICE.
No. 602,149. Patented Apr. 12, 1898.
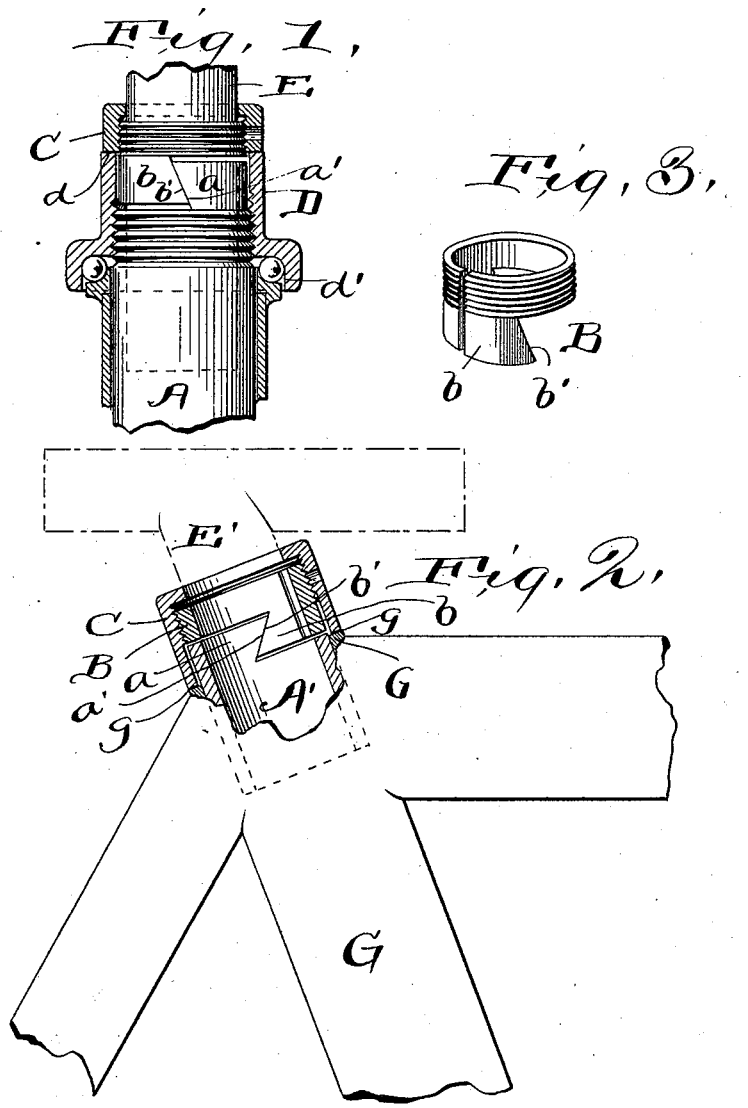
Witnesses
E. B. Gilchrist
H. M. Hutchison
Inventor,
Rollin H. White,
By his Attorneys,
Thurston & Bates

UNITED STATES PATENT OFFICE.

ROLLIN H. WHITE, OF CLEVELAND, OHIO, ASSIGNOR TO THE A. L. MOORE COMPANY, OF SAME PLACE.

CLAMPING DEVICE.

SPECIFICATION forming part of Letters Patent No. 602,149, dated April 12, 1898.

Application filed June 17, 1897. Serial No. 641,102. (No model.)

*To all whom it may concern:*

Be it known that I, ROLLIN H. WHITE, a citizen of the United States, residing at Cleveland, in the county of Cuyahoga and State of Ohio, have invented certain new and useful Improvements in Clamping Devices; and I do hereby declare the following to be a full, clear, and exact description of the invention, such as will enable others skilled in the art to which it appertains to make and use the same.

My invention relates to a clamping device adapted to clamp together two telescoping parts—as, for example, the handle-bar post and fork-head or the seat-post and vertical frame member of a bicycle.

The object is simplicity and cheapness in construction, neatness in appearance, and ease and certainty of operation.

The invention consists in the construction and combination of parts shown, described, and claimed.

In the drawings, Figure 1 is a side elevation, partly in section, of a bicycle fork-head, handle-bar post, and the clamping device. Fig. 2 is a similar view of the seat-post and vertical frame member of a bicycle and clamping device, and Fig. 3 is a perspective view of the split ring.

Referring to the parts by letters, A, Fig. 1, represents the tubular fork-head of a bicycle, which may be called the "fixed member" of the clamping device constituting my invention. A in Fig. 2 represents the fixed clamping member in another adaptation of the device—viz., is the means for securing the seat-post to a bicycle. This member A' is the vertical tubular frame member of a bicycle-frame.

About one-half of the upper end of the fixed member is cut away, leaving the parti-cylindrical end $a$, the edges $a'$ of which are undercut or beveled, substantially as shown.

B represents the movable clamping member. It is a split ring of approximately the same diameter as the part A. A part of its lower end is cut away, the remaining part $b$ being parti-cylindrical and complementary to the coöperating part $a$ of the fixed member. The edges $b'$ are undercut or beveled, substantially as shown. When the split ring B is placed upon the member A, their respective undercut ends are in engagement. The upper or completely cylindrical part of the split ring B is externally threaded. C represents a nut which screws onto this threaded end, and its lower end engages with an external shoulder on the fixed member. In Fig. 2 this shoulder is indicated by $g$, which is the upper end of the frame member proper, G, the part A' being in that case a piece of tubing which is inserted into and brazed to the said frame member, becoming thereby a part thereof. In Fig. 1 this shoulder is indicated by $d$, which is the upper end of a sleeve D, which screws upon the fork-head A and has a ball-bearing cup $d'$ on its lower end. In this application of the invention this sleeve is adjustable upon the fork-head, and the nut C will act as a jam-nut therefor.

The post to be clamped may be the handle-bar post E (shown in Fig. 1) or the seat-post E' (shown in Fig. 2) or any other post which may telescope through the split ring B and member A. When this post has been inserted and placed at the proper relative elevation, the nut C is turned on. Its downward movement will be stopped when its end strikes the shoulder, ($d$ or $g$, as the case may be.) Thereafter the split ring B will be drawn upward, which movement, because of the engagement of the beveled ends $a$ and $b$, will draw the ends of the split ring together—that is to say, will reduce the diameter of said split ring and cause it to firmly clamp the post. This securely fixes the position of the post relative to the fixed member, because the split ring cannot under the circumstances have any movement in any direction relative to the said fixed member.

Having described my invention, I claim—

1. In a clamping device, in combination, the fixed tubular member having an external shoulder and a parti-cylindrical end with beveled edges, a split ring having a parti-cylindrical end with beveled edges, which end is complementary to the corresponding end of the tubular member, and means for moving said two parts relatively in a path parallel to their axes, substantially as and for the purpose specified.

2. In a clamping device, in combination, the fixed tubular member having an external shoulder and a parti-cylindrical upper end with undercut edges, a split ring externally threaded on its upper end and having its lower end of parti-cylindrical form, complementary to the corresponding part of the fixed member and having undercut edges, and a nut screwed onto the split ring and engaging with the external shoulder on the fixed member, substantially as and for the purpose specified.

3. The combination of the front-fork head having a parti-cylindrical upper end with undercut edges, a sleeve D having a ball-cup $d'$, which is screwed onto said fork-head, an externally-threaded split ring having an unthreaded parti-cylindrical end with undercut edges, which end is complementary to the corresponding end of the fork-head, and a nut which screws onto the ring and abuts against the top of said sleeve D, substantially as and for the purpose specified.

In testimony whereof I affix my signature in presence of two witnesses.

ROLLIN H. WHITE.

Witnesses:
 E. L. THURSTON,
 ALBERT H. BATES.